(12) United States Patent
Toshimitsu (10) Patent No.: US 6,479,807 B1
(45) Date of Patent: Nov. 12, 2002

(54) MICROSCOPE

(75) Inventor: Kunio Toshimitsu, Yokohama (JP)

(73) Assignee: Nikon Corporation, Tokyo (JP)

( * ) Notice: Subject to any disclaimer, the term of this patent is extended or adjusted under 35 U.S.C. 154(b) by 57 days.

(21) Appl. No.: 09/695,427

(22) Filed: Oct. 25, 2000

(30) Foreign Application Priority Data

Oct. 26, 1999 (JP) .......................................... 11-304264

(51) Int. Cl.7 ............................................. G02B 21/06
(52) U.S. Cl. .................... 250/201.3; 359/381; 359/385; 359/388
(58) Field of Search .............................. 250/201.3, 306, 250/307; 359/368, 381, 385, 388, 222, 230–3, 738, 739

(56) References Cited

U.S. PATENT DOCUMENTS 4,363,532 A * 12/1982 Weber ........................ 359/381
4,368,947 A * 1/1983 Yoshinaga et al. .......... 359/370
4,407,569 A * 10/1983 Piller et al. ................. 359/370

* cited by examiner

*Primary Examiner*—Robert H. Kim
*Assistant Examiner*—Chih-Cheng Glen Kao
(74) *Attorney, Agent, or Firm*—Morgan, Lewis & Bockius LLP (57) ABSTRACT

A microscope which is capable of quickly switching different methods of observation such as phase contrast observation and bright field observation. The microscope comprises a condenser lens for condensing an illumination light, a diaphragm disposed on the optical axis of the condenser lens and having a variable aperture area, an aperture setting means for setting the an aperture area of the diaphragm, a slider disposed on the light condensing side of the condenser lens and having a first aperture portion having a ring slit and a second aperture portion, a first control means for restricting the aperture area to the full open aperture side when the first aperture portion is disposed on the optical axis of the condenser lens, and a second control means for releasing the restriction on the aperture portion when the second aperture portion is disposed on the optical axis of the condenser lens.

14 Claims, 8 Drawing Sheets

MICROSCOPE

The present application claims the benefit of Japanese Patent Application No. 11-304264 which is hereby incorporated by reference.

BACKGROUND OF THE INVENTION

1. Field of the Invention

The present invention relates to a microscope, and particularly, to a microscope which is provided with a slider comprising a condenser lens with a ring stop for observing a phase contrast, etc., so as to perform various kinds of observation including a bright field observation and phase contrast observation.

2. Related Background Art

In the field of biological microscopes, in addition to an ordinary bright field observation for observing a specimen by means of an illumination light, various kinds of observation are conducted including phase contrast observation and dark field observation. The "phase contrast observation" here means a method of observation by which an illumination light is applied on a translucent specimen of a cell or the like, through a slit so as to visualize the translucent specimen by utilizing the interference between a primary light passing through the specimen and a secondary light diffused by the specimen. The "dark field observation" means a method of observation by which a specimen is illuminated in such a manner that the light is not incident directly on an objective lens so as to observe only the light diffused by the specimen.

When the phase contrast observation or the dark field observation is to be conducted, according to a conventional microscope, a slider which is provided with one or a plurality of ring stops for phase contrast observation or for dark field observation is attached to a condenser lens for condensing a light of an illumination lamp to illuminate the specimen, thereby conducting the phase contrast observation or the dark field observation.

When the phase contrast observation or the dark field observation is conduced by attaching the phase contrast observing ring stop or the dark field observing ring stop to the condenser lens, the illumination light is stopped down to an appropriate slit light by means of the phase contrast observing ring stop or the dark field observing ring stop. For this reason, an aperture diaphragm belonging to the condenser lens is required to have an aperture area larger than the outer diameter of the phase contrast observing ring stop or the dark field observing ring stop, so as not to disturb the appropriate slit light which is generated by the phase contrast observing ring stop or the dark field observing ring stop.

Accordingly, in the conventional technology, when the slider provided with the phase contrast observing ring stop or the dark field observing ring stop is attached to the condenser lens, the sides of the slider drive a protrusion for driving the aperture diaphragm of the condenser lens, so that the aperture area of the condenser lens is restricted to be open larger than the outer diameter of the phase contrast observing ring stop or the dark field observing ring stop.

Recently, in the field of biological microscopes, when a biological specimen is to be inspected, there is a strong request for changing over different kinds of observing methods such as the phase contrast observation and the bright field observation, quickly and easily. However, the microscopes meeting such request are limited to the expensive ones provided with turret type condenser lenses, or the like.

On the other hand, as microscopes for students' practice, comparatively inexpensive ones are employed in which various observing methods are changed over by means of a slider attached thereto. However, there is an increasing tendency that the functions almost the same as those of higher-ranking microscopes are demanded even for the inexpensive ones. Thus such inexpensive microscopes as capable of quickly switching over observing methods are strongly demanded.

However, a conventional microscope of a slider type comprises only means for restricting the aperture diaphragm of the condenser lens to a position open larger than the outer diameter of the phase contrast observing ring stop or the dark field observing ring stop when the slider with the phase contrast observing ring stop or the dark field observing ring stop is attached to the condenser lens, For this reason, while the slider provided with the phase contrast observing ring stop or the dark field observing ring stop is still attached to the condenser lens, it is impossible to release the restriction of the aperture diaphragm of the condenser lens and to adjust the aperture diaphragm to the numerical aperture of the objective lens.

Accordingly, when the phase contrast observation or the dark field observation and the bright field observation are conducted alternately, it is required to adjust the numerical aperture by extracting the slider from the condenser lens each time the bright field observation is to be conducted. Consequently, a quick changing-over of the observation methods is difficult.

SUMMARY OF THE INVENTION

An object of the present invention is to provide a microscope which is capable of quickly changing over observation methods of various kinds, such as the phase contrast observation, the dark field observation, etc.

In order to achieve the above object, the present invention is basically characterized in that a first opening portion and a second opening portion are provided on a slider, and that there is further provided a control means which does not restrict opening/closing of the aperture diaphragm on a side portion of the slider when the second opening portion is disposed on the optical axis of the condenser lens.

According to the present invention, it is possible to quickly change over various kinds of methods of observation with the slider still attached to the condenser lens. Thus, it is possible to adjust the aperture diaphragm of the condenser lens to the numerical aperture of the objective lens when the bright field observation is to be conducted.

In order to achieve the above object, according to the present invention, there is preferably provided a microscope which comprises a condenser lens for condensing an illumination light, a diaphragm disposed on the optical axis of the condenser lens and having a variable aperture area, an aperture setting means for setting the aperture area of the diaphragm, a slider 41 disposed on the light condensing side of the condenser lens and having a first aperture portion having a ring slit and a second aperture portion, a first control means formed, for example, by a first side portion for restricting the aperture area to the full open aperture side when the first aperture portion is disposed on the optical axis of the condenser lens, and a second control means formed, for example, by a second side portion for releasing the restriction on the aperture portion when the second aperture portion is disposed on the optical axis of the condenser lens.

According to the invention described above, since the slider is provided with the first opening portion and the second opening portion, it is possible to make a quick change of between the phase contrast observation using the first opening portion and the bright field observation using the second opening portion, while the slider 41 is still attached to the condenser lens. When the bright field observation using the second opening portion is to be conducted, since the microscope has the second side portion for releasing the restriction on the aperture area of the diaphragm, it is also possible to adjust the aperture diaphragm of the condenser lens to the numeral aperture of the objective lens.

DESCRIPTION OF THE PREFERRED EMBODIMENTS

Embodiments of the present invention will be described below with reference to drawlings. However, the embodiments to be described are not to limit the technological scope of the present invention.

Figure 1:
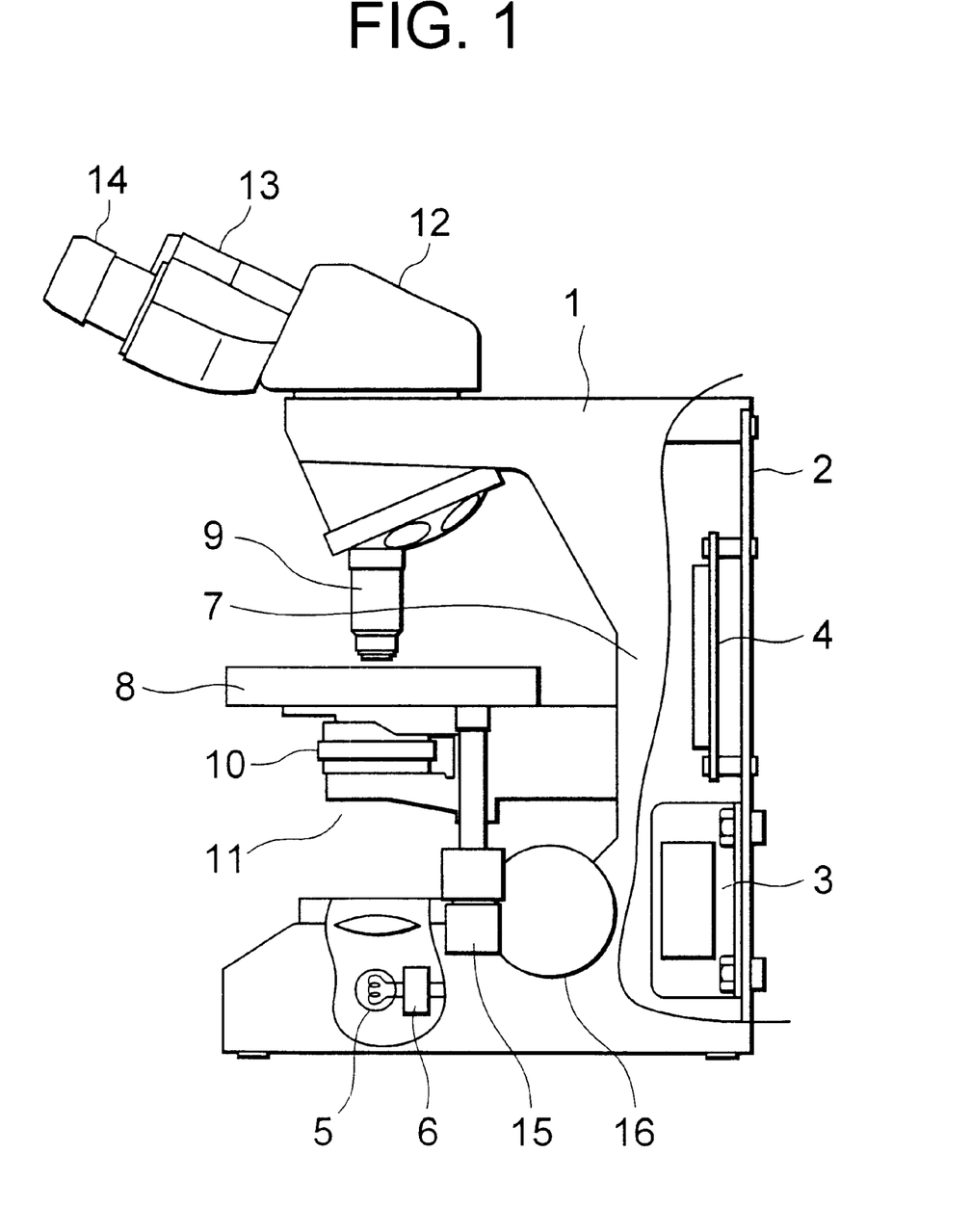
FIG. 1 is a view for showing the configuration of a microscope according to an embodiment of the present invention.

FIG. 1 is a view of a microscope according to an embodiment of the present invention, partially broken for illustrating the internal structure thereof. According to the microscope of the present embodiment, an image of a specimen mounted on a stage 8 is enlarged by an objective lens 9, a light beam from the objective lens 9 is bent by a body tube 12 to be guided to an eyepiece lens 14 attached to an observation unit 13, thereby conducting observation.

A microscope frame 1 is provided with a vertically movement handle 16 which moves the stage 8 in a vertical direction to vary a distance between the specimen mounted on the stage 8 and the objective lens 9. On the stage 8, there is also provided a stage handle 15 for moving the stage 8 in the X and Y directions crossing perpendicularly each other on the horizontal plane.

Below the stage 8, a condenser lens 10 is attached to a condenser lens attaching portion 11. The condenser lens 10 has an aperture diaphragm for adjusting an illumination light from the lamp 5, so as to illuminate the specimen mounted on the stage 8 from below. Note that, in the microscope of the present embodiment, as to be described more specifically later, a slider with a hollow hole and a phase contrast observing ring stop are mounted on the condenser 10, so as to make a change-over between the bright field observation and the phase contrast observation quickly.

A transformer 3 for producing the light power for a lamp and a voltage control base 4 are attached to a back panel 2 of the microscope. Then, the power for the lamp which is adjusted to have a predetermined voltage by the voltage control base 4 is supplied to the lamp 5 attached to a lamp socket 6.

As described above, when the transducer 3 and the voltage control base 4 which generate a large amount of heat are attached to the back panel 2, the generated heat passes through the back panel 2 to be radiated into the air, whereby an amount of the heat transmitted to a microscope arm 7 is decreased. As a result, the thermal deformation of the microscope arm 7 can be reduced, thereby reducing a change of a gap between the specimen and the objective lens 9.

Figure 2:
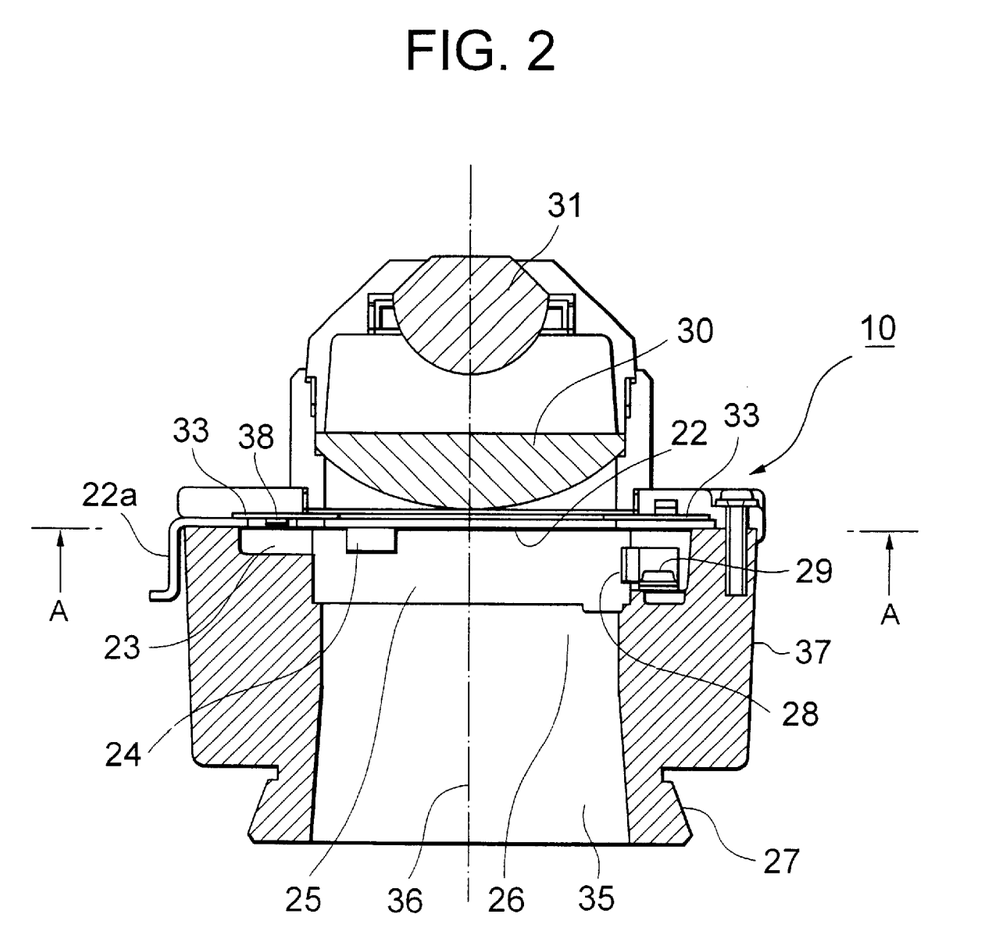
FIG. 2 is a cross-sectional view of a condenser lens according to the embodiment of the present invention.
Figure 3A:
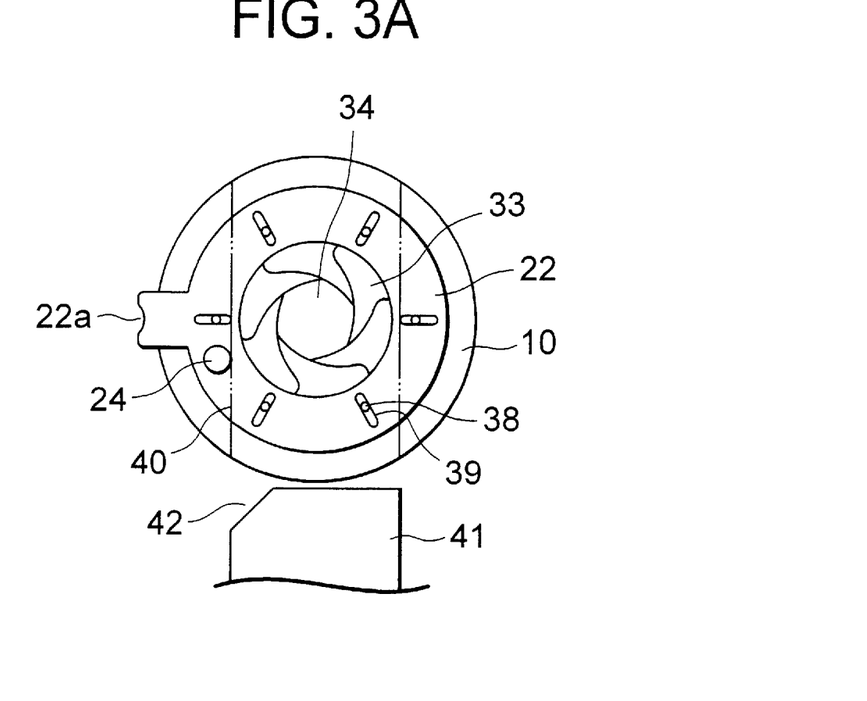
FIGS. 3A and 3B are cross-sectional views taken along line A—A in FIG. 2, showing different states of an aperture diaphragm
Figure 3B:
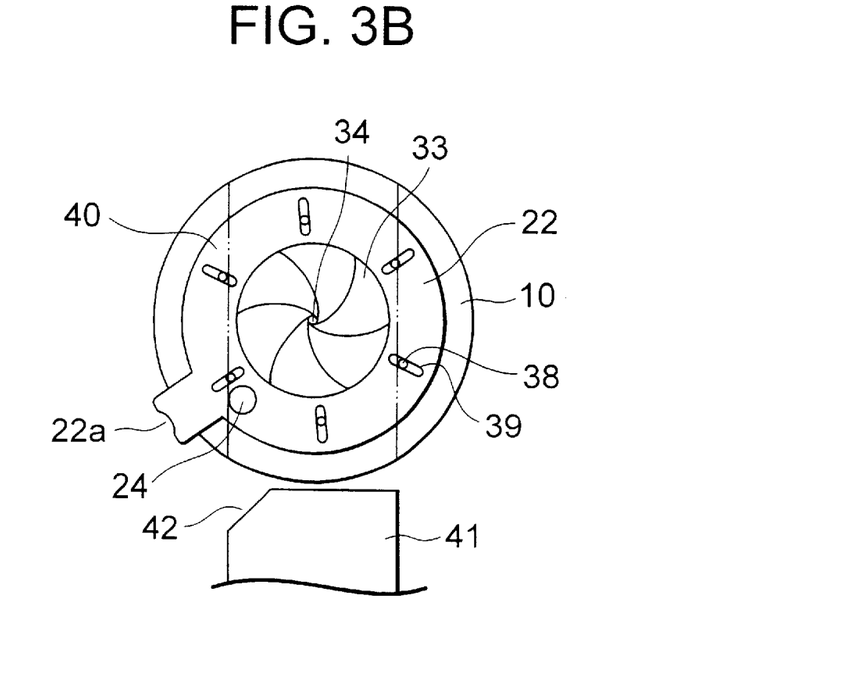
Figure 4:
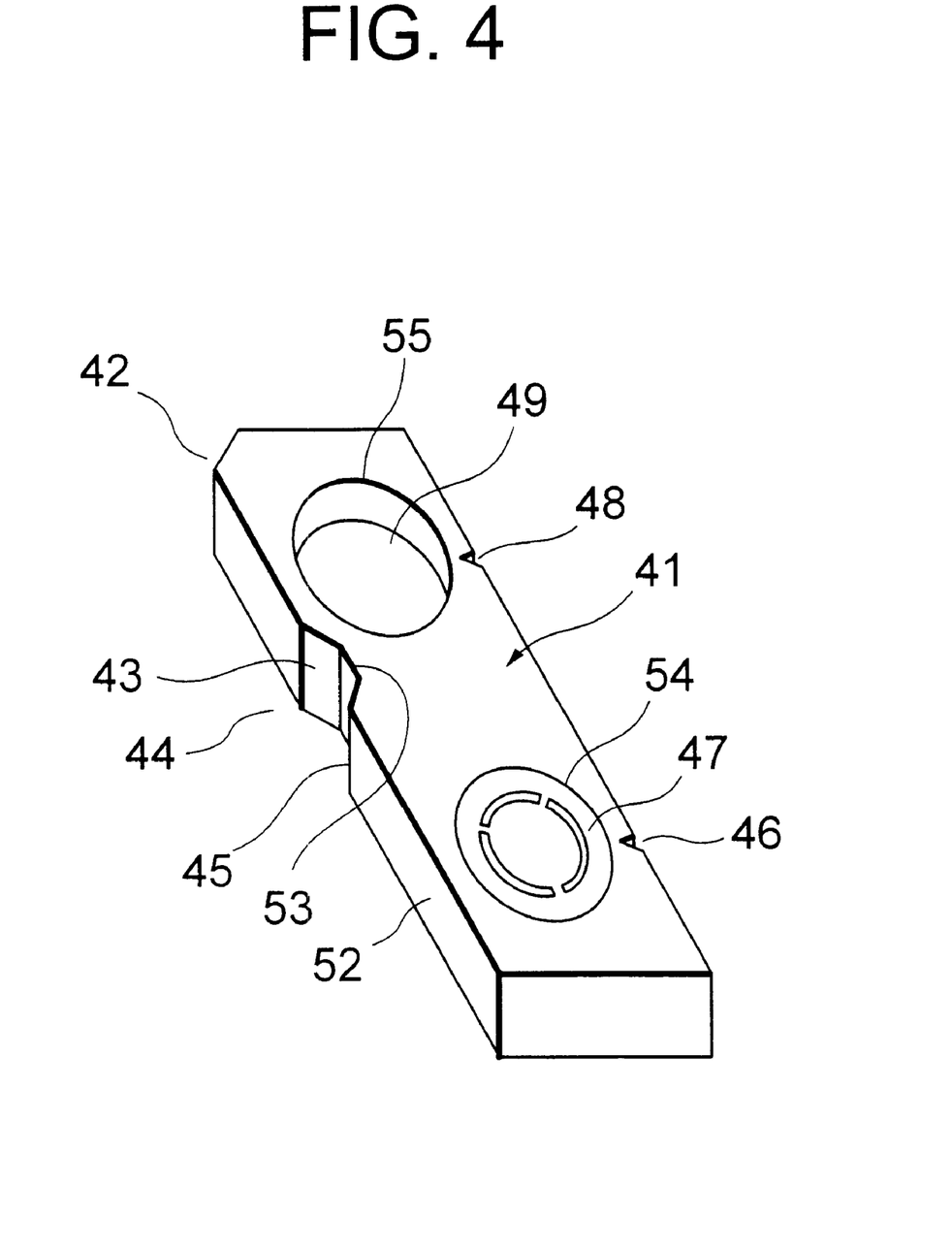
FIG. 4 is a perspective view of a slider according to the embodiment of the present invention.

Next, description will be made below on the condenser lens and the slider which are the characteristic portions of the present invention. FIG. 2 is a cross-sectional view of the condenser lens 10 in the present embodiment, and FIG. 3 is a cross-sectional view taken along the line A—A in FIG. 2. FIG. 4 is a perspective view of the slider 41 in the present embodiment.

As shown in FIG. 2 and FIG. 3, the condenser lens 10 in the present embodiment comprises lens elements 30, 31 for condensing an illumination light onto a specimen, an aperture diaphragm 34 consisting of six diaphragm blades 33, an aperture diaphragm driving unit 22 rotated by a lever 22a or a protrusion 24, and a rectangular hole 25 for receiving the slider 41. Note that the condenser lens 10 consisting of the lens elements 30 and 31 is generally called an Abbe condenser.

As shown in FIG. 2, on one of the sides of the rectangular hole 25, a click spring 28 for positioning the slider 41 is fixed to a housing portion 37 by means of a screw 29. The click spring 28 is fitted in V-shaped grooves 48, 46 of the slider 41 shown in FIG. 4, thereby placing the slider 41 at a predetermined position.

Also, a groove 26 is provided on one side of the bottom surface of the rectangular hole 25. The groove 26 is formed to have a size large enough for a protrusion (not shown) provided on the back surface of the slider 41 to pass therethrough, so as to prevent erroneous insertion of the slider 41. In the housing portion 37, an escape portion 23 is formed so as not to block movement of the protrusion 24 of the aperture diaphragm driving unit 22.

The condenser lens 10 is attached to the condenser lens attaching portion 11 shown in FIG. 1, by means of a circular dove tail 27 of the housing unit 37. Light from the lamp 5 is incident on the condenser lens 10 along the optical axis 36 from an aperture portion 35 of the condenser lens 10 and is condensed by the lens elements 30, 31 to illuminate the specimen.

On the other hand, the slider 41 of the present embodiment has a first opening portion 54 and a second opening portion 55 each in a cylindrical form, as shown in FIG. 4. The first opening portion 54 is provided with a ring stop 47 for phase contrast observation, while the second opening portion 55 becomes a hollow hole 49 for observing the bright field as it is.

On one side of the slider 41, the slider 41 has a first side portion 52 serving as the first control means for restricting the aperture diaphragm 34 of the condenser lens 10 to the full open aperture side at a position corresponding to the first opening portion 54, and a second side portion 53 serving as the second control mean for releasing the restriction on the aperture diaphragm 34 of the condenser lens 10 at a position corresponding to the second opening portion 55. Note that the second side portion 53 and inclined surfaces 43 and 45 form an escape 44.

The slider 41 is also provided on one end of the side on which the escape 44 is formed an inclined surface 42 which presses the protrusion 24 of the aperture diaphragm driving unit 22 to open the aperture diaphragm 34 when the slider 41 is inserted in the rectangular hole 25 of the condenser lens 10. Also, the slider 41, on the side opposite to the side on which the escape 44 is provided, is formed with V-shaped grooves 46, 48 for positioning the first opening portion 54 and the second opening portion 55 on the optical axis of the condenser lens 10.

As described above, the slider 41 in the present embodiment is provided with the ring stop 47 for the phase contrast observation in the first opening portion 54, while the slider 41 is formed with the hollow hole 49 for the bright field observation in the second opening portion 55, so that the phase contrast observation and the bright field observation can be changed over in an instant. In addition, since the slider 41 is provided with the first side portion 52 for restricting the movement of the protrusion 24 of the aperture diaphragm driving unit 22 in the phase contrast observation, the aperture diaphragm 34 of the condenser lens 10 can be set in the full open aperture condition. The slider 41 is also provided with the second side portion 53 which does not restrict the movement of the protrusion 24 of the aperture diaphragm driving unit 22 in the bright field observation using the hollow hole 49. Thus, it is possible to freely open or close the aperture diaphragm 34, to be adjusted to the numerical aperture of the objective lens.

Though the slider 41 is provided with the ring stop 47 for the phase contrast observation in the first opening portion 54 and with the hollow hole 49 in the second opening portion 55, a dark field observing ring stop may be provided in the first opening portion 54 and a diffusing plate of frosted glass, or the like, or a filter may be provided in the second opening portion 55.

In this case, when the diffusing plate or the filter is disposed on the optical axis of the condenser lens 10, the movement of the protrusion 24 of the aperture diaphragm driving unit 22 is not restricted due to the escape 44, so that the aperture diaphragm 34 of the condenser lens 10 can be freely adjusted. On the other hand, when the dark field observing ring stop is disposed on the optical axis of the condenser lens 10, the movement of the protrusion 24 of the aperture diaphragm driving unit 22 is restricted by the side portion 52, whereby the aperture diaphragm 34 of the condenser lens 10 is restricted to the full open aperture condition.

Next, an operation of the aperture diaphragm 34 will be described. The aperture diaphragm 34 has the six diaphragm blades 33, as shown in FIG. 3, and a protrusion 38 called a dowel is provided for each of the diaphragm blades 33. Then, the protrusions 38 are respectively inserted into six slits 39 formed on the aperture diaphragm driving unit 22 to be freely movable.

On the other hand, an unrepresented fulcrum is provided for each of the diaphragm blades 33 at a position substantially symmetrical to the position of the protrusion 38 with respect to the center of the aperture diaphragm 34. For this reason, when the aperture diaphragm driving unit 22 is rotated, the protrusions 38 of the diaphragm blades 33 are rotated together to follow the rotation of the slit 39. Further, the diaphragm blades 33 are rotated around the respective fulcrums, to thereby open or close the aperture diaphragm 34.

FIG. 3A shows a state in which an aperture area of the aperture diaphragm 34 is open larger than a predetermined size, while FIG. 3B shows a state in which the aperture diaphragm 34 is minimized. The aperture diaphragm 34 can be opened or closed by manual operation by means of a lever 22a of the aperture diaphragm driving unit 22. However, the aperture diaphragm 34 can be also set in the full open aperture state by inserting the slider 41 in the rectangular hole 25 of the condenser lens 10 to cause the inclined surface 42 of the slider 41 to press the protrusion 24 of the aperture diaphragm driving unit 22. Note that the double-dotted chain line 40 in FIGS. 3A and 3B indicates a path of the slider 41 when it is inserted into the condenser lens 10.

As described above, when the phase contrast observation is conducted by inserting the slider 41, the protrusion 24 of the aperture diaphragm driving unit 22 is restricted by the side portion of the slider 41 to a position at which the aperture area of the aperture diaphragm 34 is larger than the outer diameter of the ring stop 47 for the phase contrast observation. As a result, the illumination light appropriately set by the ring stop 47 for the phase contrast observation is not stopped down further by the aperture diaphragm 34.

Figure 5:
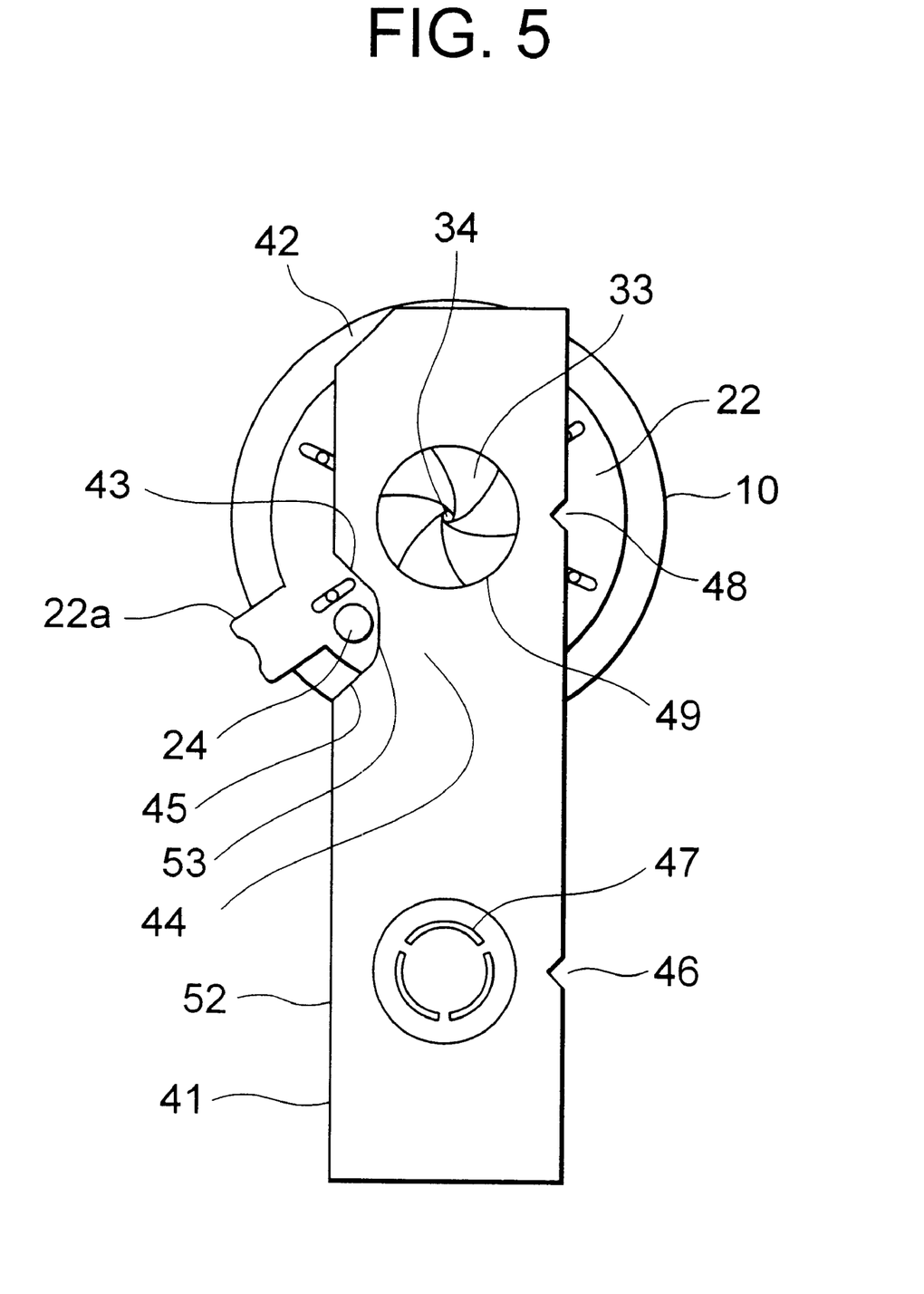
FIG. 5 is a view for showing a positional relation between the slider and the condenser lens.

Next, description will be made on the bright field observation which is conducted by providing the hollow hole 49 of the slider 41 on the optical axis of the condenser lens 10. FIG. 5 shows a state in which the hollow hole 49 of the slider 41 is positioned on the optical axis of the condenser lens 10.

As shown in FIG. 5, when the hollow hole 49 is positioned on the optical axis of the condenser lens 10, the movement of the protrusion 24 of the aperture diaphragm driving unit 22 is not restricted due to the escape 44 formed on the side portion 52 of the slider 41. Consequently, it is possible to freely adjust the aperture diaphragm 34 of the condenser lens 10 in the bright field observation, and to quickly change the bright field observation with the phase contrast observation by moving the slider 41.

Note that when the phase contrast observation is conducted in FIG. 5, the slider 41 is moved upward on the sheet surface. The protrusion 24 of the aperture diaphragm driving unit 22 is moved along the inclined surface 45 of the escape 44 in a direction to open the aperture diaphragm 34. Then, the aperture area of the aperture diaphragm 34 is restricted by the side portion 52 of the slider 41 to a position at which the aperture area is larger than the outer diameter of the ring stop 47 for the phase contrast observation. On the other hand, when the slider 41 is moved downward on the sheet surface from the position in FIG. 5, the protrusion 24 of the aperture diaphragm driving unit 22 is moved along the inclined surface 43 of the escape 44, so as not to prevent extraction of the slider 41.

Figure 6:
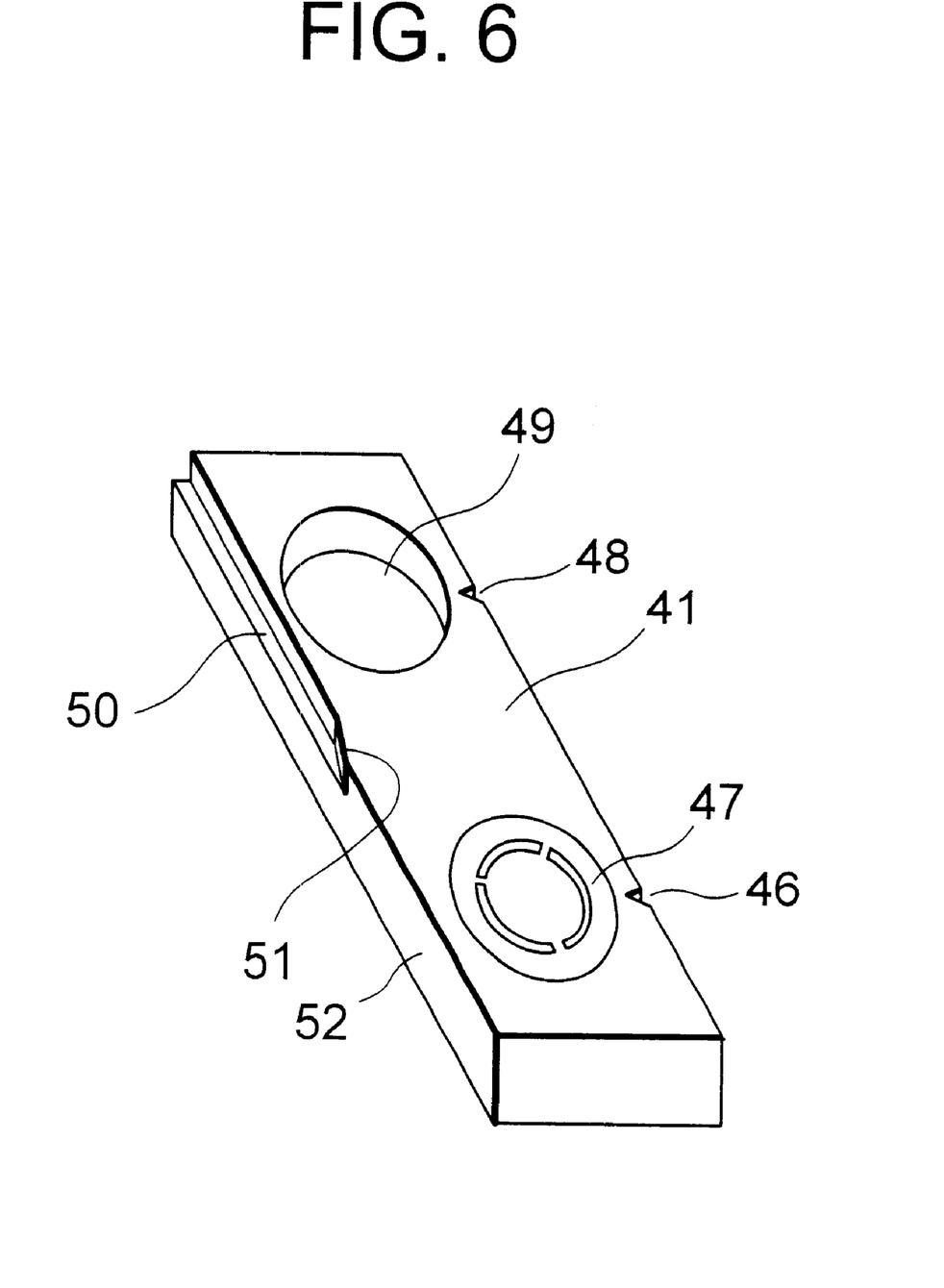
FIG. 6 is a perspective view of the slider according to another embodiment of the present invention.

FIG. 6 is a perspective view of the slider 41 according to another embodiment of the invention. The slider 41 in this embodiment is provided with the hollow hole 49, the ring stop 47 for the phase contrast observation and the V-shaped grooves 48, 46, like that in FIG. 4. In addition, an escape 50 is formed for the protrusion 24 of the aperture diaphragm driving unit 22.

Also in this slider 41, since the escape 50 is formed on a side surface of the hollow hole 49, when the hollow hole 49 is positioned on the optical axis of the condenser lens 10, the movement of the protrusion 24 of the aperture diaphragm driving unit 22 is not restricted, so that the numerical aperture in the bright field observation can be adjusted.

On the other hand, when the ring stop 47 for the phase contrast observation of the slider 41 is positioned on the optical axis of the condenser lens 10, the protrusion 24 of the aperture diaphragm driving unit 22 is moved along the inclined surface 51. Then, the protrusion 24 is restricted by the side portion 52 of the slider 41, so that the aperture diaphragm 34 is in the full open aperture condition. For this reason, the illumination light which is appropriately set by the ring stop 47 for the phase contrast observation is not stopped down further by the aperture diaphragm 34.

When a phase contrast observation is conducted, centering of the objective lens with the phase contrast ring stop is effected. The phase contrast condenser lens is formed with a through hole (not shown) through which a tool (not shown) for the centering is to be inserted. The tool inserted through the hole, reaches the slider.

The side 52 of the slider 41 is formed with threaded portion (not shown) for the centering of the ring stop 47 with the objective lens. The slider is so set in the phase contrast condenser lens that the side on which the threaded portion is formed, may be closer to the observer of the microscope. The tool for the centering (for example, an L-shaped tool),is inserted into the centering hole of the slider, to reach the threaded portion of the slider. Then, the tool is rotated to move the slider forward or backward, thereby an image of the phase contrast ring stop being coincided to a phase ring of the objective lens. Thus, the centering is completed. Such centering is needed for each objective lens.

Figure 7:
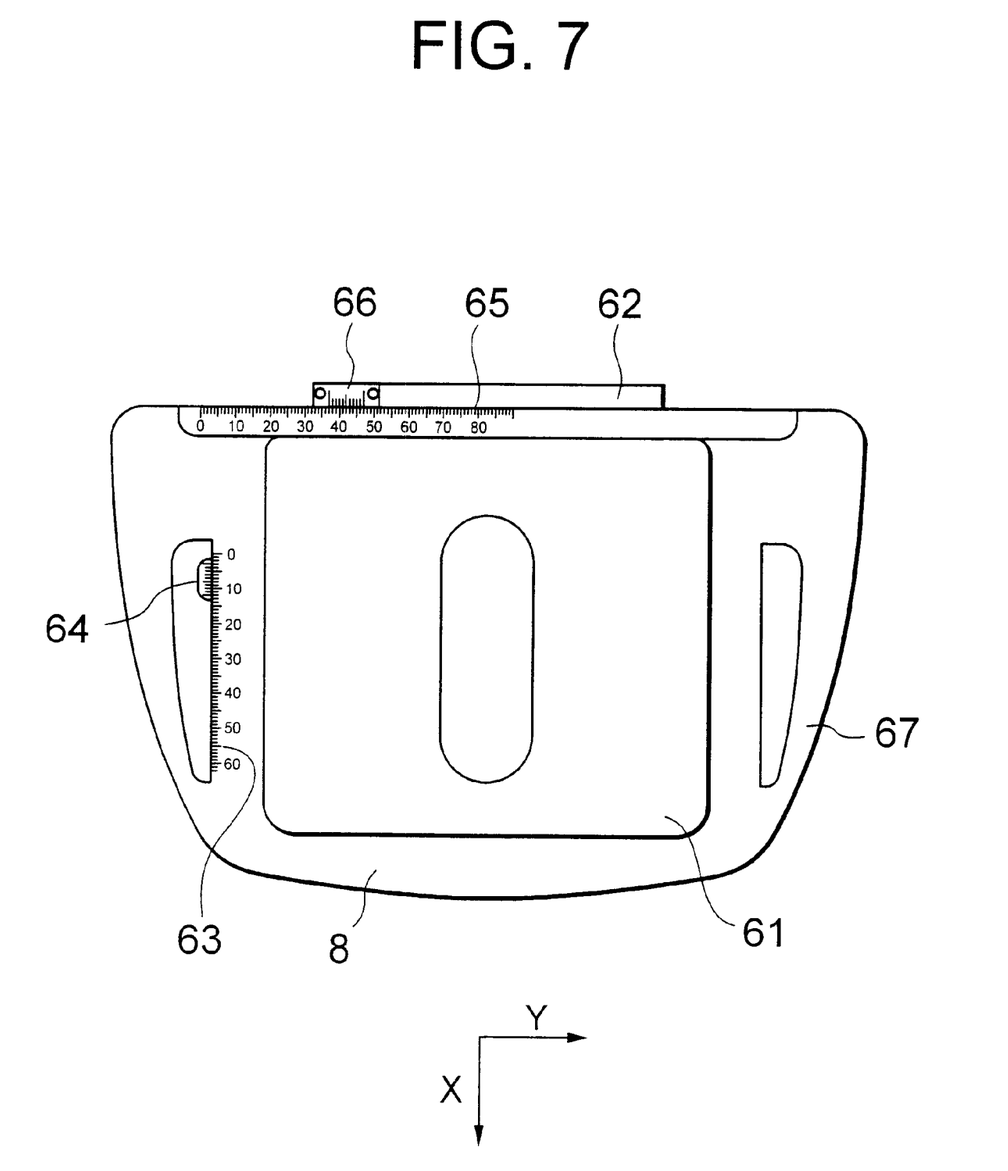
FIG. 7 is a plan view of a stage according to the embodiment of the present invention.

FIG. 7 is a plan view of the stage 8 of the microscope according to the present embodiment. The stage 8 comprises an upper plate 61 on which a specimen is mounted, a cover 67 for covering the outer periphery of the upper plate 61, and an X-directional scale 63 and a Y-directional scale 65 for indicating the positions in the X and Y directions of the stage 8. This stage 8 is driven by the stage handle 15 shown in FIG. 1, and is movable in the X and Y directions.

In this case, an amount of movement of the stage 8 in the X direction can be read by the X-directional scale 63 and an X-directional vernier 64, while an amount of movement of the stage 8 in the Y direction can be read by the Y-directional scale 65 and a Y-directional vernier 66. A guide 62 for moving the stage 8 in the Y-direction can also be provided on the stage 8.

Figure 8A:
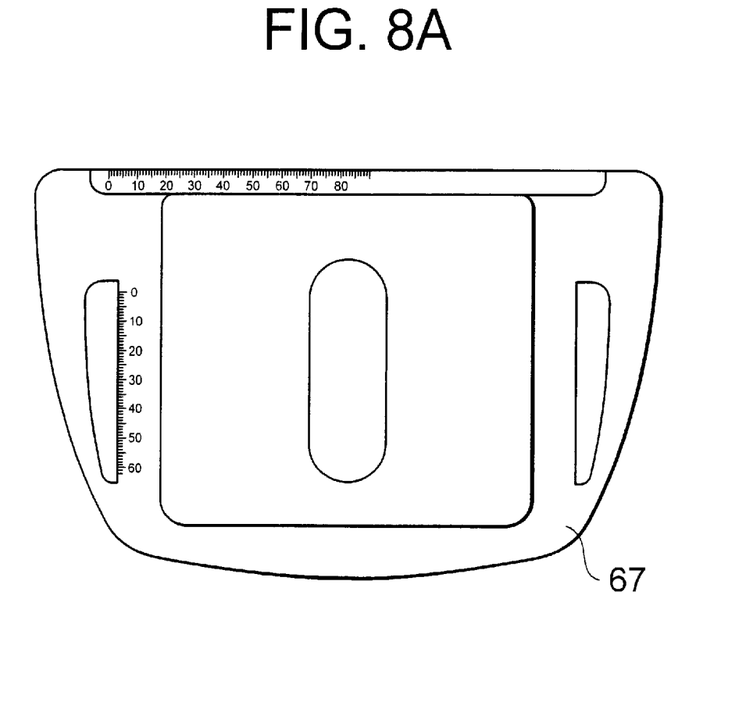
FIGS. 8A and 8B are exploded views of the stage according to the embodiment of the present invention.
Figure 8B:
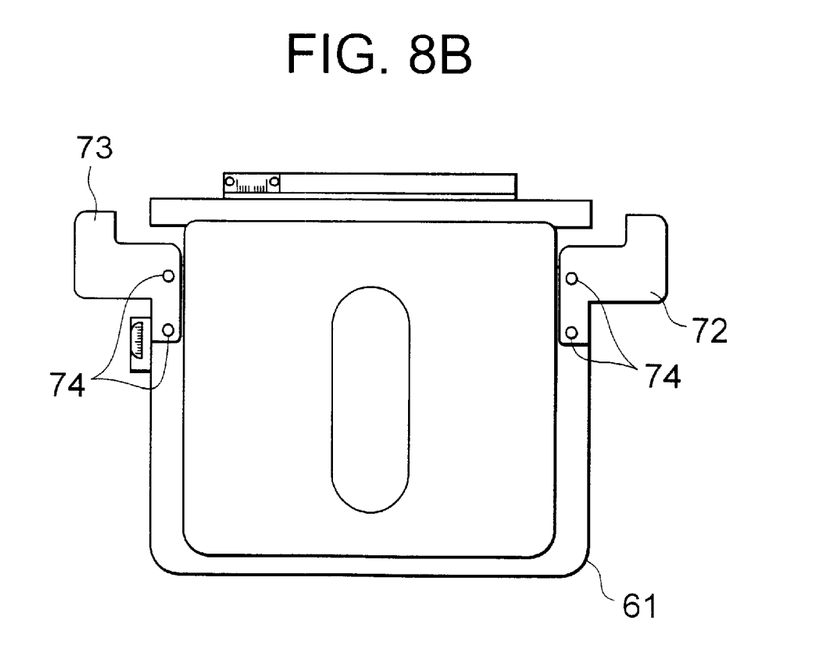

FIG. 8 is a plan view of the cover 67 and the upper plate 61 of the stage 8. As shown, the stage 8 in the present embodiment can be divided into the cover 67 and the upper plate 61.

The cover 67 is formed of resin having high environmental tolerance such as polypropylene or polybutylene terephthalate. The cover 67 is attached to the upper plate 61 by means of a snap fit or a crawl, by utilizing the characteristics of the resin. However, it may be attached by means of a set screw.

The upper plate 61 is formed approximately in a simple rectangle so as to be easily gripped by a vice at the time of surface machining. Moreover, extensions 72, 73 for attaching the stage handle 15 and a guide mechanism are secured to the upper plate 61 by means of screws 74.

As described above, the stage 8 according to the present embodiment is arranged such that the upper plate 61 and the cover 67 can be separated from each other and, when the upper plate 61 is subjected to the surface machining, the parallel sides of the upper plate 61 can be gripped by the vice, thereby facilitating the surface machining of the upper plate 61. Moreover, since the cover 67 is molded of resin, or the like, and a coating work therefor can be omitted. Therefore, the manufacturing cost of the stage 8 can be reduced.

The scope of the present invention is not limited to the above-described embodiments, but can cover the aspects of invention set forth in the claims of this specification and equivalents thereto.

As described above, according to the present invention, when the first aperture portion is disposed on the optical axis of the condenser lens, the first control means restricts the aperture area to the full open aperture side, while when the second aperture portion is disposed on the optical axis of the condenser lens, the second control means releases the restriction on the aperture area. As a result, the user is not required to take the trouble of opening the diaphragm whenever the first aperture portion having a ring slit is disposed on the optical axis of the condenser lens and, when the second aperture portion is disposed on the optical axis of the condenser lens, the user can freely adjust the diaphragm.

What is claimed is:

1. A microscope comprising:

a stage for mounting thereon a specimen;

a light source for illuminating said specimen;

a condenser lens disposed between said light source and said stage, said condenser lens condensing said illumination light and irradiating said specimen with said illumination light;

a diaphragm disposed on the optical axis of said condenser lens and having a variable aperture area;

an aperture setting means for setting the aperture area of said diaphragm;

an objective lens for forming an image of said specimen;

an eye piece lens for observing the image formed through said objective lens;

a slider disposed on the light condensing side of said condenser lens and having a first aperture portion having a ring slit and a second aperture portion;

a first control means for restricting said aperture area to the full open aperture side when said first aperture portion is disposed on the optical axis of said condenser lens; and a second control means for releasing said restriction on said aperture area when said second aperture portion is disposed on the optical axis of said condenser lens.

2. A microscope according to claim 1, wherein:

said aperture setting means includes a protrusion which can contact one side of said slider;

said first control means is a first side portion formed on said one side of said slider;

said first side portion disposes said protrusion at a position for restricting said aperture area to the full open aperture side when said first aperture portion is disposed on the optical axis of said condenser lens;

said second control means is a second side portion formed on said one side and different from said first side portion; and said second side portion is disposed at a position for not restricting the position of said protrusion when said second aperture portion is disposed on the optical axis of said condenser lens.

3. A microscope according to claim 1, wherein:

said first aperture portion and said second aperture portion of said slider are rectangular in front view; and said first control means and said second control means are formed on a side of said slider.

4. A microscope according to claim 3, wherein:

said first control means is formed in the neighborhood of said first aperture portion, and said second control means is formed in the neighborhood of said second aperture portion.

5. A microscope according to claim 3, wherein:

said first control means formed on the side of said slider is a linear portion; and said second control means formed on the side of said slider is a concaved portion.

6. A microscope according to claim 3, wherein:

said slider is formed on the opposite side thereof with a positioning portion for positioning said first aperture portion or said second aperture portion on the optical axis of said condenser lens.

7. A microscope according to claim 1, wherein said first aperture portion is provided with a ring stop for observing a phase contrast or a ring stop for observing a dark field.

8. A slider to be disposed on the light condensing side of a condenser lens of a microscope which comprises said condenser lens for condensing an illumination light, a diaphragm disposed on the optical axis of said condenser lens and having a variable aperture area and an aperture setting means for setting said aperture area of said diaphragm; said slider being further provided with:

a first aperture portion having a ring slit and a second aperture portion, first control means for restricting said aperture area to the full open aperture side when said first aperture portion is disposed on the optical axis of said condenser lens of the microscope; and second control means for releasing said restriction on the aperture portion when said second aperture portion is disposed on the optical axis of said condenser lens.

9. A slider according to claim 8, wherein:

said aperture setting means includes a protrusion which can contact one side of said slider;

said first control means is a first side portion formed on said one side of said slider, said first side portion disposing said protrusion at a position for restricting said aperture area to the full open aperture side when said first aperture portion is disposed on the optical axis of said condenser lens; and said second control means is a second side portion formed on said one side and different from said first side portion, said second side portion being disposed at a position for not restricting the position of said protrusion when said second aperture portion is disposed on the optical axis of said condenser lens.

10. A slider according to claim 8, wherein:

said first aperture portion and said second aperture portion of said slider are rectangular in front view; and said first control means and said second control means are formed on a side of said slider.

11. A microscope according to claim 10, wherein:

said first control means is formed in the neighborhood of said first aperture portion and said second control means is formed in the neighborhood of said second aperture portion.

12. A microscope according to claim 10, wherein:

said first control means formed on the side of said slider is a linear portion; and said second control means formed on the side of said slider is a concaved portion.

13. A microscope according to claim 10, wherein:

said slider is formed on the opposite side thereof with a positioning portion for positioning said first aperture portion or said second aperture portion on the optical axis of said condenser lens.

14. A slider according to claim 8, wherein said first aperture portion is provided with a ring stop for observing a phase contrast or a ring stop for observing a dark field.

* * * * *